Jan. 17, 1933.  W. EDDY  1,894,484
AUTOMOBILE SIGNAL
Filed Jan. 29, 1931   2 Sheets-Sheet 1
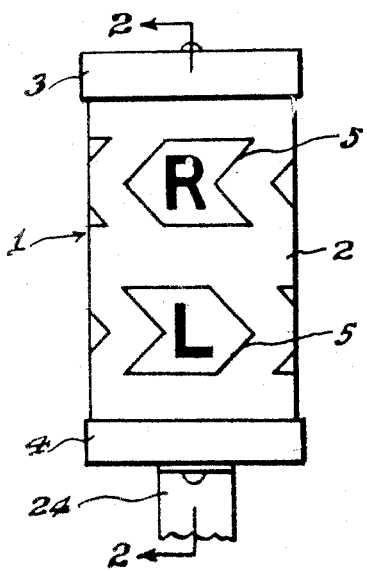
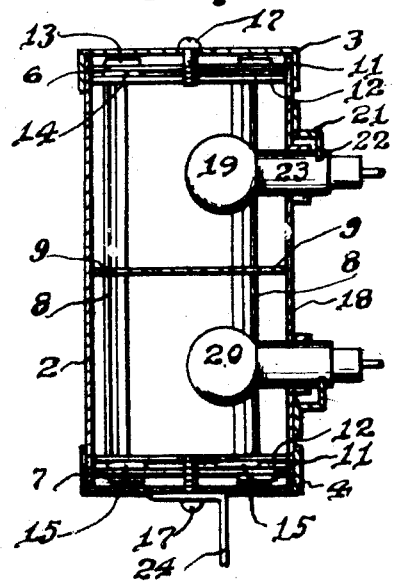
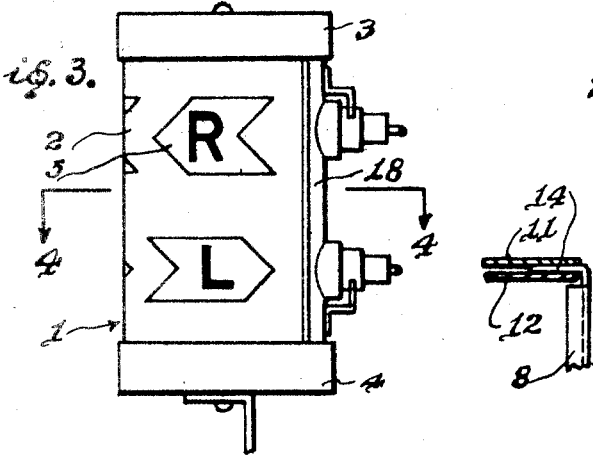
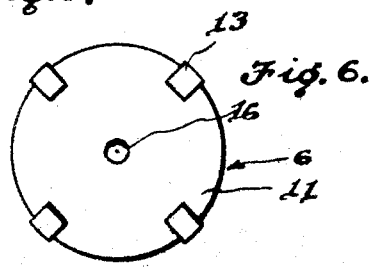
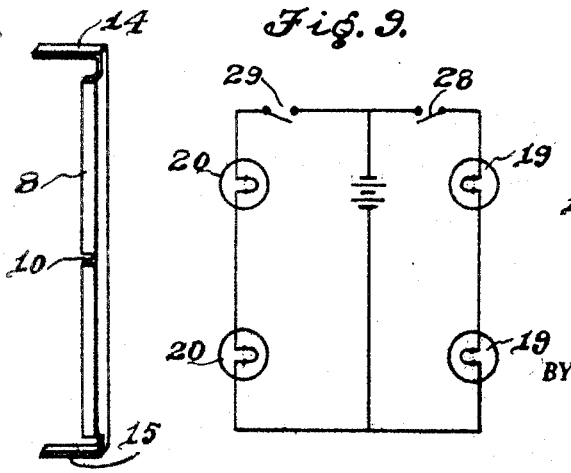
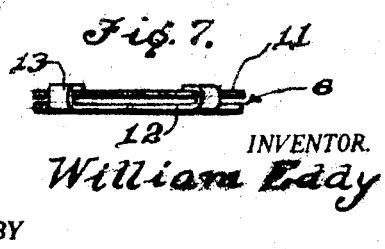
INVENTOR.
William Eddy
BY
J. Kaplan
ATTORNEY.

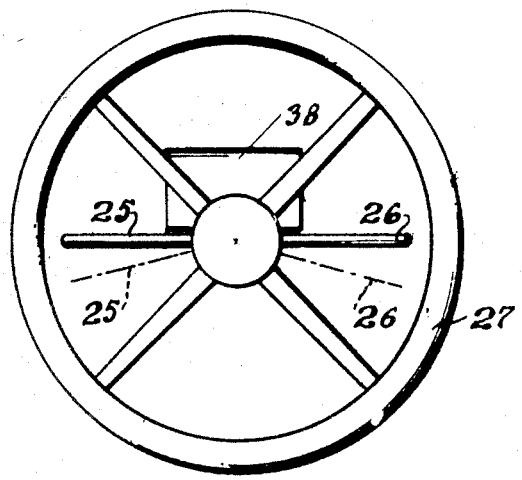
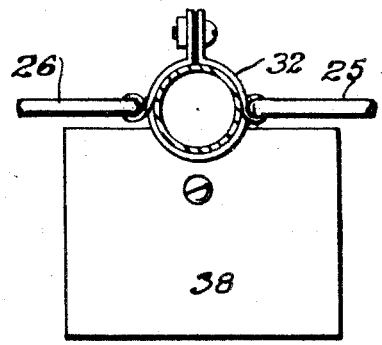
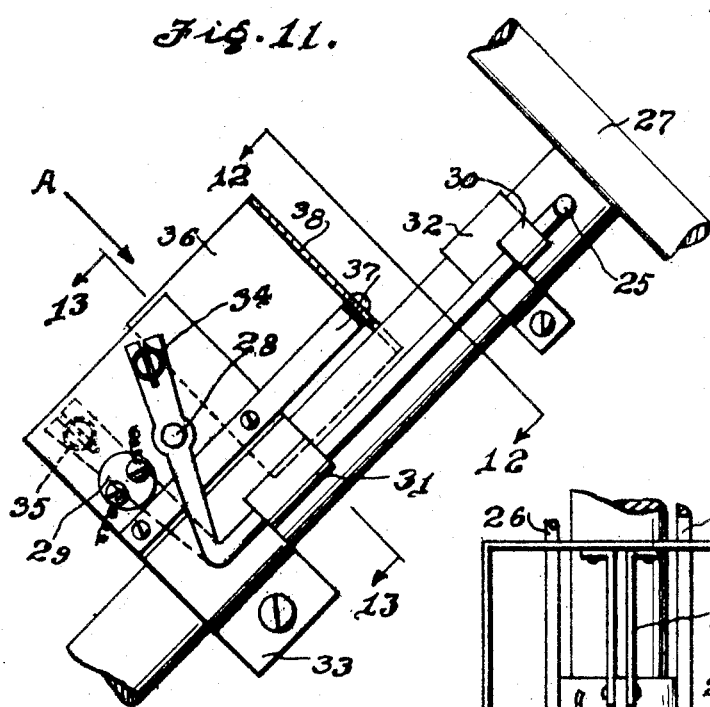
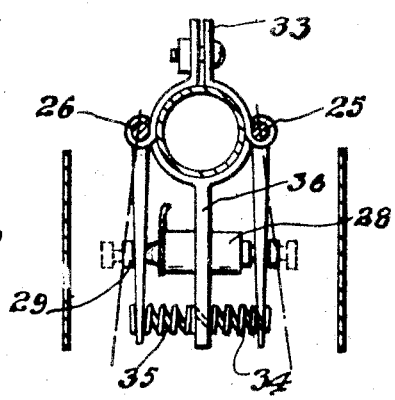
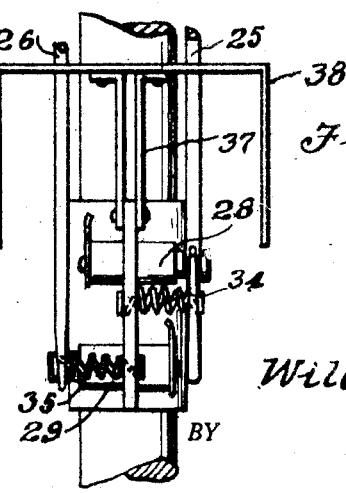

Patented Jan. 17, 1933

1,894,484

UNITED STATES PATENT OFFICE

WILLIAM EDDY, OF SPRINGFIELD, OHIO

AUTOMOBILE SIGNAL

Application filed January 29, 1931. Serial No. 512,134.

This invention relates to automobile signals.

The principal object of the invention is to provide a signal for indicating the direction the vehicle will turn.

Another object of the invention is to provide a pair of signals attached to the front and rear of the vehicle respectively, and arranged to operate in unison for indicating, in advance, the direction the vehicle will turn.

Other objects of the invention will appear as the disclosure progresses. The drawings are intended to merely indicate a possible embodiment of the invention. It is obvious that the actual needs of manufacture may necessitate certain mechanical changes. It is therefore not intended to limit the invention to the embodiment illustrated but rather to define such limits in the appended claims. For a more general understanding of the invention attention is called to the drawings. In these drawings like reference characters denote like parts throughout the specification.

In the drawings:

Figure 1 is a front view of the signal.

Figure 2 is a section on line 2—2 of Figure 1.

Figure 3 is a side view of the signal.

Figure 4 is a section on line 4—4 of Figure 3.

Figure 5 is a detail.

Figure 6 is a top view of the ceiling of the signal.

Figure 7 is an edge view thereof.

Figure 8 is a perspective view of one of the pillars.

Figure 9 is a wiring diagram.

Figure 10 is a view of the steering wheel of the motor car with the switch control attached thereto.

Figure 11 is a side view thereof partly in section.

Figure 12 is a section on line 12—12 of Figure 11.

Figure 13 is a section on line 13—13 of Figure 11.

Figure 14 is a view taken in the direction of arrow A of Figure 11.

Referring now to the drawings in detail, numeral 1 designates the casing consisting of body member 2 made from a transparent material and held in place by the top and bottom flanged rings 3 and 4. On the outside surface of the body member is painted a series of radially spaced signs 5 consisting of the letters "R" and "L" enclosed in arrow like borders. The letter "R" stands for right and the letter "L" stands for left.

Within the casing is a ceiling and floor member 6 and 7 supported in place by the pillars 8. Dividing the interior in two compartments is a partition 9 held in place by the notched out portions 10 of the pillars. The members 6 and 7 are alike and consist of two circular disks 11 and 12 held together by a series of bent over lips 13 integral with one of the disks as noted in Figures 6 and 7. Between these two disks fit the bent over ends 14 and 15 of the pillars as indicated in Figure 5. In the center of the disks is a threaded hole 16 in which fits the screws 17 for holding the flanged rings 3 and 4 in place.

At the rear of the casing is a metallic support 18 for holding the electric bulbs 19 and 20 in place. To prevent the bulbs from accidentally working loose a set of fingers 21 are provided as best seen in Figure 2 which fit at their free ends into the slots 22 of the bulb holder 23. At the bottom of the casing is a bracket 24 for attaching the signal to any convenient place on a motor car.

In Figures 10 to 14 are shown the switch mechanism for operating the signal. This mechanism is attached to the steering post of the vehicle and comprises two handle members 25 and 26 in the form of rods adjacent the steering wheel 27 and standard electric make and break devices or switches 28 and 29 operated by said handle members. The handle members are pivoted in the bearings 30 and 31 of the clamps 32 and 33 and the bottom leg members engage with the make and break devices or switches 28 and 29. At the ends of the leg members are springs 34 and 35 for normally urging said members inwardly. The make and break devices and the springs are attached to the plate 36 integral with clamp 33. Attached to plate is a set of brackets 37 for supporting the guard 38.

The operation of the device is as follows. When the handle 26 is moved to the position as shown in the dotted line in Figure 10 the switch or make and break device 28 will close the electric circuit and cause the bulbs 19 to light up and indicate "R" or right on the signal. As stated heretofore one signal is attached to the front of the vehicle and the other to the rear. Thus when the handle is operated both of the corresponding bulbs in the front and rear signals will light up at the same time. When the handle 25 is moved to the dotted line the switch or make and break mechanism 29 will operate and cause the other set of bulbs 20 in the front and rear signals to light up and show on the signal "L" or left.

It will thus be seen that I have provided a simple, practical and useful device of the character described. The signals have been placed on the market and have given very good results.

The operating handles are conveniently arranged near the steering wheel so they can easily be moved.

Having described my invention, I claim:

1. In a device of the class described, in combination, a transparent hollow cylinder, a pair of flanged caps, a set of pillars in the interior of said hollow cylinder, ceiling and floor members at the ends of said pillars, each of said ceiling and floor members comprising a pair of circular disks, the ends of said pillars bent over, said bent over portions inserted between the said pair of disks, a screw for fastening each of said flanged caps to said ceiling and floor members a partition dividing the interior of said body member in two compartments, said partition supported by said pillars, and an electric bulb in each compartment.

2. In a device of the class described, a transparent cylindrical body member, a frame in the interior of said body member, said frame consisting of a series of flanged pillars radially spaced and provided with notches in the middle of the flanges, the upper and lower ends of said pillars bent over and extending in the same direction as said notched flanges, a ceiling and floor member, said ceiling and floor members each made from two disks and held together by bent over lips of one of the disks, the bent over ends of said pillars inserted between the respective pairs of said disks, a central partition held in place by the notched portions of said pillars, and electric lighting means in the interior of said transparent cylindrical member.

In testimony whereof I affix my signature.

WILLIAM EDDY.